(12) United States Patent
Zierer

(10) Patent No.: US 7,464,507 B2
(45) Date of Patent: Dec. 16, 2008

(54) DEVICES AND METHODS FOR PROTECTING EXPOSED PIPE ENDS DURING CONSTRUCTION

(75) Inventor: Donald R. Zierer, St. Charles, IL (US)

(73) Assignee: Zierer Investment Enterprises LLC, St. Charles, IL (US)

( * ) Notice: Subject to any disclaimer, the term of this patent is extended or adjusted under 35 U.S.C. 154(b) by 357 days.

(21) Appl. No.: 10/972,290

(22) Filed: Oct. 22, 2004

(65) Prior Publication Data

US 2006/0096195 A1    May 11, 2006

(51) Int. Cl.
*E04C 2/52* (2006.01)

(52) U.S. Cl. .................. 52/220.8; 52/220.1; 52/98; 52/99; 52/219; 249/83; 285/124.1; 285/124.2

(58) Field of Classification Search ............... 52/220.1, 52/220.8, 98, 99, 591.4, 219, 576, 577; 249/83; 174/50, 482, 483; 285/124.1, 124.2, 124.3, 285/124.5, 42; 138/96 R, 106
See application file for complete search history.

(56) References Cited

U.S. PATENT DOCUMENTS

| | | | |
|---|---|---|---|
| 3,163,909 A | 1/1965 | Williams | |
| 3,469,815 A | 9/1969 | Brenneman | |
| 3,609,210 A | 9/1971 | Guritz | |
| 3,701,837 A | 10/1972 | Fork | |
| 3,956,573 A | 5/1976 | Myers et al. | |
| 4,106,255 A * | 8/1978 | Eckel | 52/586.1 |
| 5,125,619 A | 6/1992 | Collins | |
| 5,146,720 A | 9/1992 | Turner | |
| 5,172,531 A * | 12/1992 | Fowler | 52/220.1 |
| 5,180,074 A | 1/1993 | Bowman et al. | |
| 5,257,487 A | 11/1993 | Bantz et al. | |
| 5,344,106 A * | 9/1994 | Beele | 248/56 |
| 5,350,884 A | 9/1994 | Littrell | |
| 5,377,939 A | 1/1995 | Kirma | |
| 5,593,115 A | 1/1997 | Lewis | |
| 5,595,362 A * | 1/1997 | Rinderer et al. | 248/27.1 |
| 5,615,850 A | 4/1997 | Cloninger | |
| 5,836,130 A | 11/1998 | Unruh et al. | |
| 6,061,983 A | 5/2000 | McCleskey | |
| 6,161,355 A * | 12/2000 | Gratt | 52/561 |
| 6,176,057 B1 | 1/2001 | Bouchet et al. | |

(Continued)

*Primary Examiner*—Jeanette Chapman
*Assistant Examiner*—Daniel Kenny

(57) ABSTRACT

Devices and methods are provided for protecting pipe ends that project upwardly during building construction and for reducing the safety hazard posed by such pipe ends. The devices include a rigid body suitable for positioning on a base on which concrete will be poured, having two opposed end walls, two opposed side walls, a recess therebetween, a top end, a bottom end, and a lateral tab extending from at least one end wall. A shield is securable to at least one side wall for protecting the pipe ends during later construction. In two embodiments, a plate positioned at the bottom end has an opening dimensionally and spatially configured to correspond to each pipe end requiring protection. The method comprises: (a) positioning a device in accordance with the invention on the base so the pipe ends project into the recess and the body forms a barrier between the pipe ends and the concrete slab to be formed; (b) securing the device to the base by inserting a securing structure through each lateral tab; and (d) after the concrete layer has been formed, removing any securing structure from above the surface of the concrete to continue with the construction of the building.

17 Claims, 8 Drawing Sheets

U.S. PATENT DOCUMENTS 6,672,029 B2 1/2004 Tucker
6,725,611 B2 4/2004 DeFiglio
2004/0016191 A1* 1/2004 Whitty ........................ 52/232

* cited by examiner

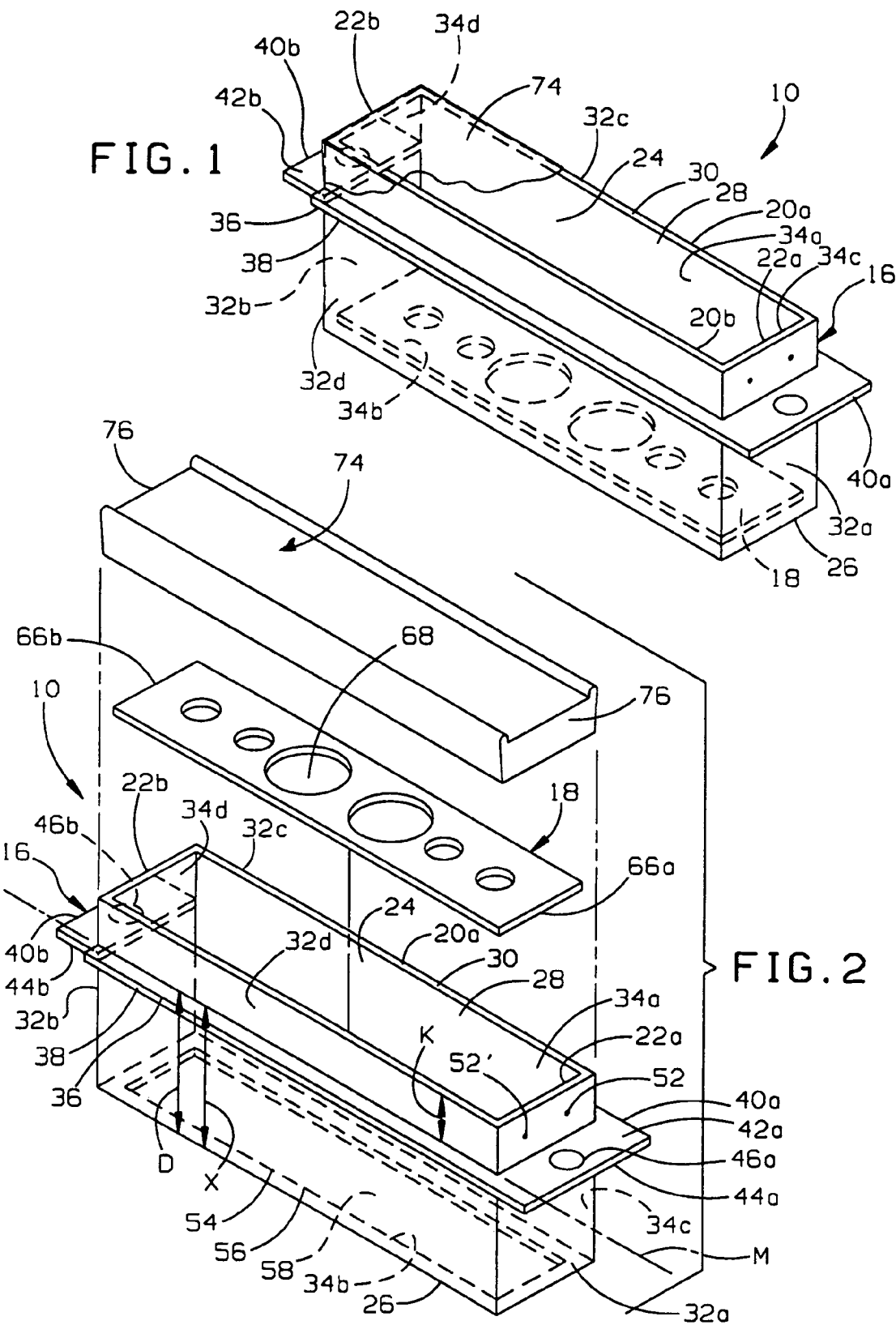

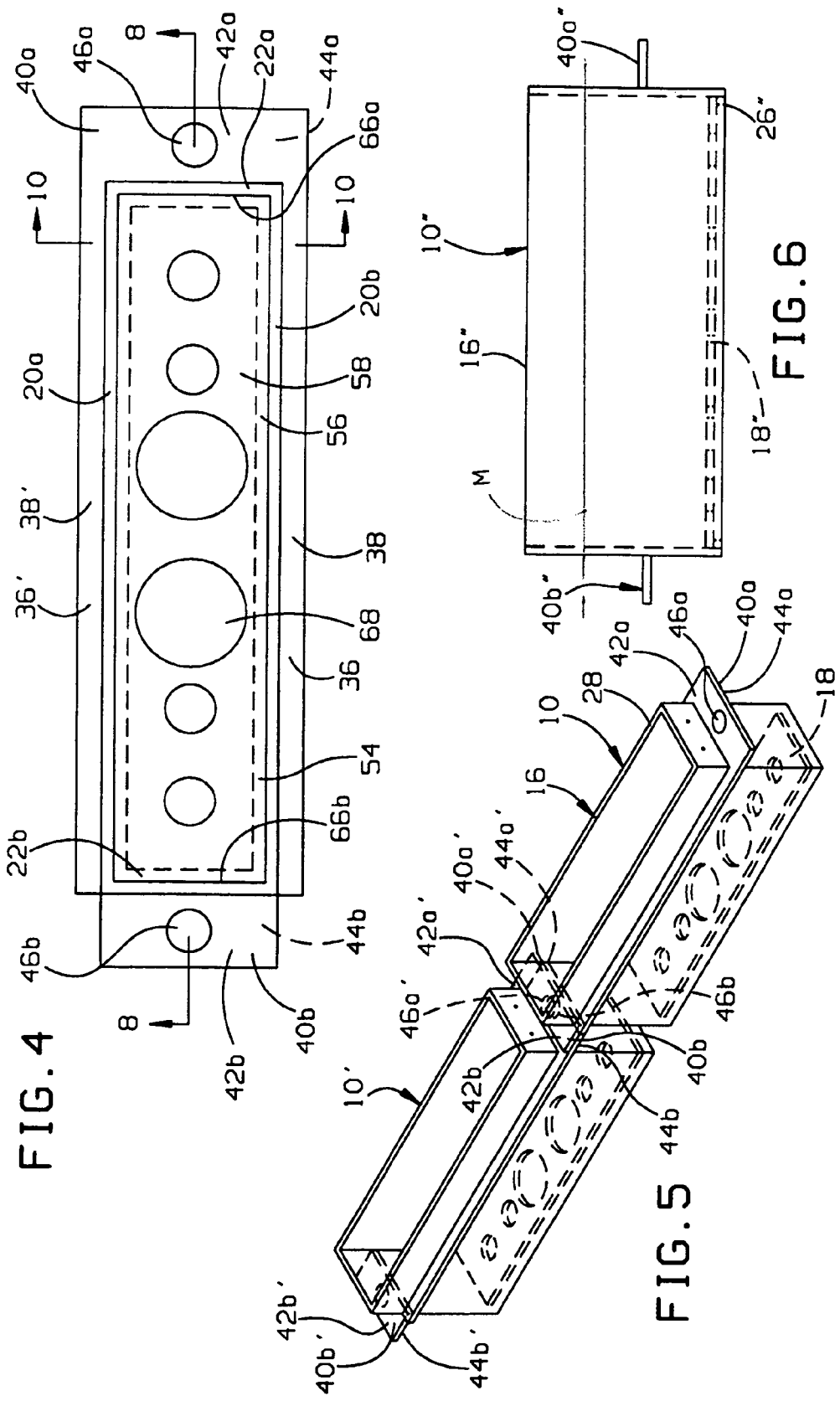

DEVICES AND METHODS FOR PROTECTING EXPOSED PIPE ENDS DURING CONSTRUCTION

FIELD OF THE INVENTION

This invention relates generally to devices and methods for protecting pipes during construction of residential and commercial buildings or other structures. More particularly, the present invention relates to devices and methods for protecting the exposed portions of upwardly projecting pipe ends in a construction environment from being accidentally moved or damaged during construction or from causing bodily injury to workmen at the work site.

BACKGROUND OF THE INVENTION

In the construction industry, builders of homes and other structures typically lose significant capital in correcting the position of pipes, including electrical conduit, that were moved out of position accidentally by workmen or poured concrete during an early stage of construction.

Conventionally, pipes and conduit are laid so their ends project upwardly above what will be the surface of a concrete floor, whether the concrete will be formed on a prepared ground or on a structural floor at an elevated level in a multi-level building. The pipe ends have an upward orientation so that after the concrete has been poured and set, the projecting ends can be connected to piping and conduit that will convey utilities to particular areas of the building. Typically, before the concrete is poured, the exposed ends of the pipes are tied together in succession and to an external support for securement. However, in spite of such efforts, the pipe ends frequently become bent or twisted in a variety of directions by, e.g., workmen backing into a pipe or the unyielding force of the poured concrete.

Before construction can continue, the orientation of the pipes needs to be corrected so that utility connections can be made and the pipes would not otherwise project through a finished wall, making an undesired entrance into an adjacent room. However, the misalignment of the pipes often makes it difficult, if not impossible, for tradesmen to complete the connection of utilities. Moreover, correction of the problem costs time and money: the solution generally entails removing—by jack hammering—concrete from around the pipes, manually repositioning the pipes, and then repouring concrete around the correctly positioned pipes.

Additionally, the construction industry incurs significant costs in repairing pipes and conduit that are damaged during later stages of construction, such as the accidental puncturing of plumbing pipes by nail guns during installation of drywall or trim.

Yet another problem facing the construction industry concerns the potential hazard the upwardly projecting pipe ends pose to workmen at the work site. The pipe ends project upwardly to varying heights—ranging from ankle high to waist high. The exposed pipe ends put workmen at risk of injury should they fall, trip or become impaled on a projecting pipe.

Therefore, a need exists for a system and method of protecting pipes, which provides a solution to the foregoing problems.

BRIEF SUMMARY OF THE INVENTION

The present invention is directed to devices and methods for protecting the upwardly projecting ends of pipes at a construction site from being moved out of position or damaged during construction or from causing injury to workmen. The devices and methods are generally suitable for protecting an array of pipes (such as water and drain pipes), conduit and other tube-like devices which, in final construction, are typically situated between frame studs, behind drywall or counters, or the like. The present invention also has application in protecting a single pipe in a building construction environment.

The inventive pipe protectors and methods offer numerous commercial advantages over conventional construction techniques, including protection of pipes from external forces, reduced production costs by eliminating the need to tear out concrete and manually re-align the pipes, reduced material costs by allowing shorter projecting pipe ends to be used for completing connections to utilities, and accelerated production time. Additionally, the recessed position of the pipes, which extend from below the surface of the concrete, coupled with the lateral enclosure of the pipe ends by the walls of the body, reduces safety hazards at the work site. Further, the inventive pipe protectors provide access to tradesmen for making the requisite connections to the pipe ends.

In accordance with one aspect of the invention, a pipe protector is provided for protecting the pipe ends that project upwardly from a base of prepared ground or a structural floor on which a concrete slab will be formed. The pipe protector has a rigid body and a plate that is insertable into the body. The body has an open bottom end, an open top end, two opposed side walls, two opposed ends, and a recess therebetween. A lateral tab extends outwardly from at least one end wall, and preferably both end walls, at a point between the bottom end and an elevation, with respect to the bottom end, that corresponds with the surface of the concrete slab to be formed. The lateral tab has an aperture adapted to receive a securing structure therethrough for securing the pipe protector to the base so as to restrict the pipe protector from moving on the base. The securing structure is generally an elongated member that is inserted through the lateral tab and driven into the base. The plate has an opening corresponding dimensionally and spatially to each pipe end to be protected for fitting the pipe end therethrough. The pipe protector also includes a supporting structure such as a lip at the bottom end that is directed toward the recess for supporting the plate in the recess. The body is preferably dimensionally configured to fit between frame studs in a building under construction, and is also preferably formed of a rigid plastic although it may be constructed of wood or a corrosion-resistant metal.

In another embodiment, the lateral tab on one end wall extends into a different but parallel plane with respect to the lateral tab on the opposed end wall, so as to allow the pipe protector to be interconnected with another serially adjacent pipe protector in an end-to-end configuration for protecting a linear array of pipe ends.

In a further embodiment, a shield securably attachable to at least one side wall at the top end protects the pipe ends within the recess from nail damage during installation of dry wall and trim and other construction fasteners.

Another embodiment includes a level indicator disposed on at least one wall for guiding the elevation to which the concrete should be poured on the base. In another embodiment, a cover is removably attachable at the top end for preventing concrete from entering the recess through the top end.

In another aspect of the invention, a pipe protector is provided for pipe ends projecting upwardly at a building construction site. The pipe protector comprises a rigid body having an open bottom end, an open top end, two opposed side walls and two opposed end walls defining a recess between the bottom end and the top end, and a lateral tab extending outwardly from at least one end wall for securing the pipe protector to the base on which a concrete slab will be formed. The side walls and end walls extend upwardly from the bottom end and terminate in a top edge at the top end. The lateral tab has an aperture adapted to receive a securing structure therethrough for securing the body to the base. In one embodiment, a shield is securable to the top edge of at least one side wall for protecting the pipe ends in the recess. Another embodiment includes a level indicator disposed on at least one of the walls—generally a side wall; preferably, the level indicator comprises a flange. In another embodiment, the body is formed of a rigid plastic and is preferably a unitary piece molded of rigid plastic.

In accordance with yet another aspect of the invention, another pipe protector is provided. The pipe protector includes a rigid body and a bottom face securably attached to the body. The body is suitable for placement on a base to form a barrier between the pipe ends projecting from the base and the concrete to be poured onto the base outside the body. The body has two opposed side walls and two opposed end walls defining a recess therebetween, an open top end in communication with the recess, a bottom end, and a lateral tab depending from at least one of the end walls. The bottom face has an opening corresponding dimensionally and spatially to each pipe end for fitting the pipe end therethrough. In one embodiment, the pipe protector is a single unitary piece formed of a rigid plastic, such as by molding, and is preferably dimensionally configured for positioning between frame studs. In another embodiment, a shield is securably attachable to a top edge of at least one side wall.

Each of the pipe protectors of the present invention is suitable for positioning on a base on which concrete will be poured. When the body is positioned on the base, the bottom end contacts the base, and the pipe ends project into the recess. In such position, the body forms a barrier between the area surrounding the projecting pipe ends and an area of the base external to the body on which the concrete slab will be formed. After the concrete slab is formed, a portion of the body extends above the concrete to provide access to the pipe ends within the recess. The open top of the pipe protectors grant tradesmen access to the pipe ends within the recess.

In accordance with yet another aspect of the invention, a method is provided for protecting pipe ends during building construction from becoming misaligned or damaged as construction continues and from causing injury to persons at a work site. The method uses any of the pipe protectors in accordance with the invention, which protectors have a rigid body of two opposed side walls and two opposed end walls defining a recess therebetween, a top end terminating in a top edge, a bottom end, a lateral tab extending outwardly from at least one of the end walls for securing the body to the base, and an optional level indicator—preferably a flange—for setting the depth of the concrete slab being formed. The method includes: (a) prior to formation of the concrete slab, positioning the body on a base on which concrete will be poured having at least one pipe end to be protected, such that the bottom end contacts the base, the pipe ends project into the recess and the body surrounds an area of the base around the pipe ends so as to form a barrier between the pipe ends and an area of the base external to the body on which the concrete slab will be formed; (b) securing the body so positioned to the base with a securing structure to restrict movement during formation of the concrete slab; and (c) after the concrete slab has been formed, removing the securing structure from above the concrete surface. The securing step is accomplished by driving the securing structure downwardly through the aperture of the lateral tab and into the base to a depth sufficient to secure the pipe protector to the base. In one embodiment, the method includes controlling the depth of the concrete by aligning the poured concrete with the level indicator. In another embodiment, the method includes attaching a shield to at least one side wall at the top end for protecting the pipe ends within the recess from external damage during subsequent construction.

In one embodiment, the method further includes: (a) providing a plate having an opening configured dimensionally and spatially to correspond to each pipe end to be protected for fitting such pipe end through the opening, the plate being receivable into the recess where the body includes a supporting means for holding the plate within the recess; (b) fitting each pipe end through the corresponding opening; and (c) guiding the plate downwardly along each pipe end into the recess.

In yet another aspect of the invention, a method is provided that uses a pipe protector having a body with a bottom end and a bottom face fixedly attached at the bottom end. The bottom face has an opening configured dimensionally and spatially to correspond with each pipe end to be protected. The method includes positioning the pipe protector on a base so each of the pipe ends requiring protection are fitted through a corresponding opening in the bottom face and extend into the recess. In such position, the body forms a barrier between an area of the base surrounded by the body and an area of the base external to the pipe protector on which the concrete slab will be formed. The pipe protector is secured to the base with a securing structure to its restrict movement during formation of the concrete slab. After the slab is formed, the securing structure is removed from above the surface of the concrete slab.

BRIEF DESCRIPTION OF THE DRAWINGS

Other advantages and features of the invention will become more apparent from the following description and from reference to the accompanying drawings in which:

FIG. 1 shows a perspective view of a pipe protector with a cover, in an assembled formation, in accordance with the invention;

FIG. 2 shows an exploded perspective view of the pipe protector of FIG. 1;

FIG. 4 is a top view of the pipe protector of FIG. 1, without the cover;

FIG. 5 is a perspective view showing the pipe protector of FIG. 1, without the cover, interconnected to a serially adjacent pipe protector in an end-to-end configuration;

FIG. 6 is an elevational view of another embodiment of a pipe protector in accordance with the invention;

FIG. 9 depicts top views of various embodiments of a plate for insertion into the body of the pipe protector.

DETAILED DESCRIPTION OF THE INVENTION

This invention includes all alternatives, modifications, and equivalents that may be encompassed within the spirit and scope of the invention, as defined by the appended claims. Where a preferred embodiment is described below, the invention is not limited to that embodiment. Throughout the following, like numerals refer to like parts or steps.

As used herein, the following terms have the meanings set forth below:

The term "base" refers to any surface over which concrete will be poured in the construction of a building or other structure. The term refers to both a grade of prepared ground, typically of gravel over ground in the construction of a building slab, and to a structural floor in a multi-level building.

The term "building" refers broadly to residential and commercial buildings and other such structures.

The term "pipe" refers broadly to a pipe, conduit, and any other elongated tube-like device suitable for conveying utilities such as water and gas, and wires for electric, phone or data transmission within a building, including drainage pipes. In this application, the terms "pipes" and "pipe ends" are used interchangeably.

The term "serially adjacent" refers to the positioning of two pipe protectors so the end wall of one pipe protector faces an end wall of the other pipe protector.

The term "stud" refers to the supports made of wood, plastic, fiberglass, steel and other materials used in the construction of a building frame.

Figure 3:
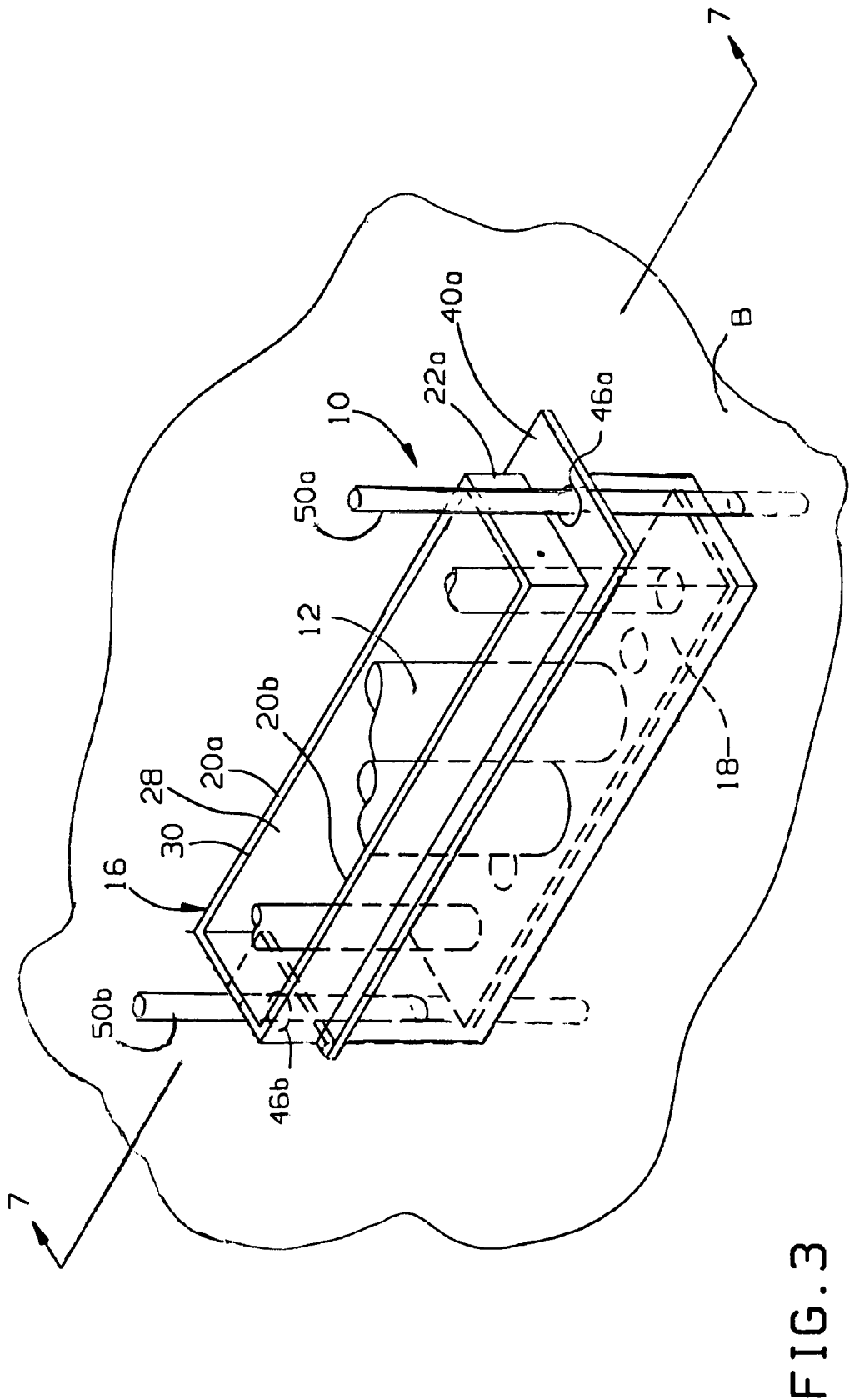
FIG. 3 is a perspective view of the pipe protector of FIG. 1, without the cover, secured to a base on which a concrete slab will be formed.
Figure 7:
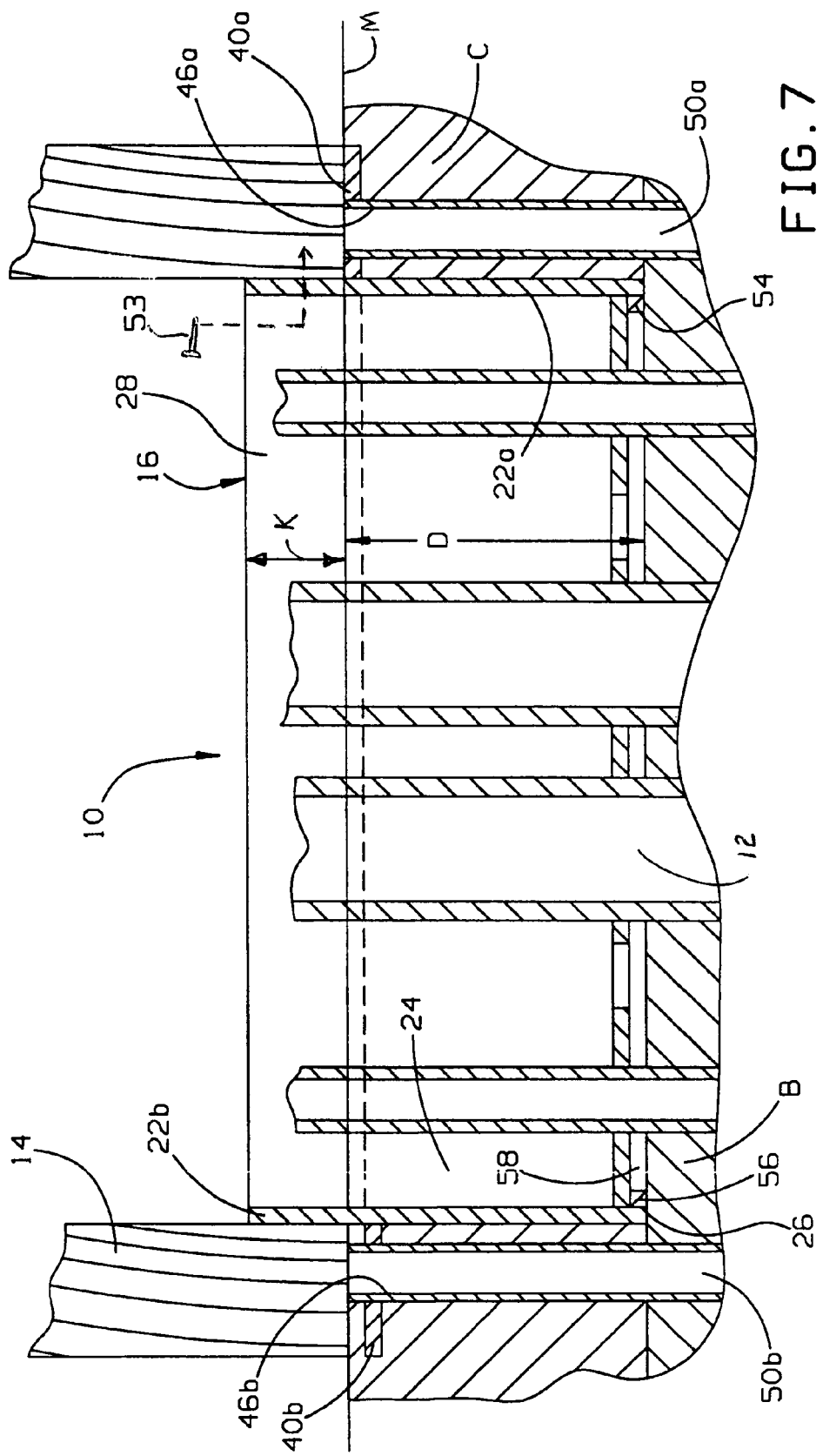
FIG. 7 is sectional view of the pipe protector of FIG. 3, taken along line 7-7, shown with a concrete slab formed around the pipe protector.

FIGS. 1-9 show a pipe protector 10 in accordance with one aspect of the present invention that is especially suitable for protecting upwardly projecting pipe ends at a building construction site. The pipe protector 10 can be secured to a base that will be covered with concrete and has pipe ends 12 projecting upwardly therethrough, as shown in FIG. 3. When in position, the pipe protector surrounds an area of the base adjacent to the pipe ends 12 and forms a protective barrier between such area and the remainder of the base outside the pipe protector 10 that will be covered with concrete. In such position, the pipe ends 12 are surrounded by the pipe protector 10. FIG. 7 shows the pipe protector 10 during a later stage of construction, with the concrete slab C formed around the pipe protector and frame studs 14 erected on the concrete C.

The pipe protector 10 includes a body 16 and a separate plate 18, as shown in FIG. 1. The body 16 has two opposed side walls 20a,20b, two opposed end walls 22a,22b, and a recess 24 therebetween and is opened at a bottom end 26 and at a top end 28. The top end 28 terminates in a top edge 30. The bottom end 26 is flat or generally planar to provide even positioning on the base. The side walls 20a,20b and the end walls 22a,22b have an exterior surface 32a,32b,32c,32d and an interior surface 34a,34b,34c,34d. The plate 18, described in detail below, is insertable into the recess 24.

The body 16 and the plate 18 are typically constructed of a rigid material such as polyvinyl chloride (PVC) or acrylonitrile butadiene styrene (ABS), as examples. However, any other suitable rigid, corrosion-resistant material that can withstand the force of poured concrete may be used, such as other suitable rigid plastics, wood or a corrosion-resistant metal, as examples. Preferably, the body 16 and the plate 18 are formed of a rigid plastic, and most preferably, by molding. In one embodiment, the body 16 is a single, unitary piece, fabricated of molded plastic by, e.g. injection molding.

The body 16 has a height dimension greater than the depth of the concrete slab to be formed. The depth of the concrete is predetermined before the concrete is poured. As depicted in FIG. 2, with respect to the body 16, the horizontal line M located at a vertical distance X from the bottom end 26 corresponds with the surface of the concrete slab that will be formed and is designated hereinafter as the "concrete elevation level." Thus, the vertical distance X corresponds with the pre-determined depth of the concrete slab, which depth depends upon the nature of the construction. The inventive pipe protector can be configured for use with concrete slabs of various depths.

The height dimension of the body 16 is also preferably greater than the longest pipe end 12 in the recess 24 when the body is positioned on the base B. Preferably, when the pipe protector 10 is set on the base B, the top edge 30 aligns with a horizontal plane above the longest pipe end 12, as shown in FIGS. 3 and 7. Alternatively, before or after the body 16 has been set on the base B, the pipe ends 12 may be cut to a suitable length, preferably so as to not extend above the top edge 30 of the body 16.

FIGS. 2 and 7 show that the concrete elevation level, denoted by the horizontal line M, divides the body 16 horizontally into a portion D and a portion K. Portion D corresponds with the part of the body 16 that will be recessed below the concrete surface such that the pipes 12 enter the recess 24 at a point from below the surface of the concrete, as shown in FIG. 7. Portion K corresponds with the part of the body 16 that will extend above the concrete. Portion K can be of any height needed to protect the projecting pipe ends and preferably ranges from about ½ inch to about 30 inches or higher, as needed.

The pipe protector 10 is dimensionally configured with a width and a length to fit between frame studs 14 built upon the concrete layer. The width—i.e., the distance between the exterior surfaces 32c,32d of opposed side walls 20b,20a—is complementary to the width of frame studs, and the length of the pipe protector 10 from end wall to end wall is sufficient to fit between adjacent frame studs. Typically, the body 16 has a generally rectangular shape; however, some curvature may be provided along a vertical junction adjoining the adjacent side walls 20a,20b and end walls 22a,22b.

In one embodiment, at least one of the side walls 20a,20b or the end walls 22a,22b includes at least one level indicator 36,36' for guiding the concrete contractor in setting elevations and in grading and finishing the final concrete layer to the same elevation line. The level indicator 36,36' is disposed on at least one of the side walls 20a,20b or the end walls 22a,22b in alignment with the elevation to which the concrete will be poured—i.e., the concrete elevation level indicated by the horizontal line M at a vertical distance X from the bottom end, as shown in FIG. 2. The level indicator 36,36' preferably comprises a flange 38,38' which extends laterally from at least a portion of the side wall 20a,20b and preferably from across the entire wall, as shown in FIGS. 2 and 4. Alternatively, the level indicator may be of any other suitable form such as a mark or an etched depression, as examples.

As shown in FIGS. 1-3, a lateral tab 40a,40b extends outwardly from at least one of the end walls 22a,22b and preferably both end walls 22a,22b. The lateral tab 40a,40b may have any shape such as rectangular as shown, elongated, square, curvilinear, or any other suitable shape that allows the lateral tab 40a,40b to function in securing the body 16 to the base, as described below.

As shown in FIG. 4, each lateral tab 40a,40b has an upper surface 42a,42b, a lower surface 44a,44b, and an aperture 46a,46b therethrough. The lateral tabs 40a,40b extend into two different parallel planes with respect to each other. Preferably, the planes are adjacent each other. As a result, one lateral tab aligns vertically in a cooperative spatial relationship with a lateral tab on another serially adjacent pipe protector to allow the serially adjacent pipe protectors to be interconnected in an end-to-end configuration, as shown in FIG. 5. In this configuration, the aperture 46b of lateral tab 40b of the pipe protector 10 is in vertical alignment with the aperture 46a' of a lateral tab 40a' on a serially adjacent pipe protector 10', and the upper surface 42b of the lateral tab 40b interfaces with the lower surface 44a' of the lateral tab 40a' on the pipe protector 10' so that a vertical centerline through such lateral tabs 40b,40a' is in correspondence. Although FIG. 5 shows only two pipe protectors 10,10' with the lateral tabs 40b,40a' in vertical alignment in such relational cooperation, any number of pipe protectors may be interconnected in a chain as needed for protecting an extended array of pipes.

With respect to the bottom end 26, the lateral tabs 40a,40b extend outwardly at an elevation sufficient for firmly securing the pipe protector 10 to the base B. As shown in FIGS. 2, 6 and 7, the lateral tabs 40a,40b typically extend from the end walls 22a,22b into a horizontal plane at a point between the bottom end 26 and the concrete elevation level, shown by the horizontal line M. FIG. 6 illustrates one embodiment of a pipe protector 10" with a plate 18" having lateral tabs 40a",40b" disposed near the bottom end 26" of the body 16". Thus, when the concrete is poured to the concrete elevation level, the lateral tabs 40a,40b extend into a horizontal plane below the surface of the concrete or preferably, as shown in FIG. 7, in substantial alignment with the surface of the concrete.

In one embodiment, shown in FIG. 2, one of the lateral tabs 40a aligns with the same plane as the flange 38 and may be contiguous with the flange 38. The other lateral tab 40b extends outwardly into a different plane parallel with the flange.

As shown in FIG. 3, the lateral tabs 40a,40b play a role in securing the body 16 to the base B to restrict the body 16 from moving in the poured concrete. Typically, the aperture 46a, 46b is dimensionally configured to receive a securing structure. The securing structure 50a,50b is generally an elongated member such as a pipe, a piece of conduit, a rod, a spike, a nail, a stake and any other suitable staking device known in the art that is inserted through the aperture and driven into the base to a depth sufficient to restrict the movement of the body 16 on the base B. Because any suitable securing structure may be used to secure the pipe protector 10 to the base and because such devices are well known in the art, a detailed disclosure of securing structures is not provided here.

Later, after the concrete has been poured and set around the body 16, any portion of the securing structure 50a,50b extending above the concrete surface is removed to allow a frame studs 14 to be constructed adjacent to the portion K of the body 16. Typically, the securing structure 50a,50b is cut flush with the surface of the concrete and the cut portion is removed, as shown in FIG. 7.

As shown in FIG. 2-3, at least one of the end walls 22a,22b has a stud hole 52,52' for accepting a fastener 53 such as a nail or screw to secure the body 16 to a frame stud 14 set adjacent to the end wall 22a,22b after the concrete has set. The stud hole 52,52' is disposed in the portion K of the body. Preferably, the end wall 22a,22b has at least one stud hole 52,52', and most preferably, both end walls 22a,22b have at least one stud hole 52,52'. The fastener 53 is driven through the stud hole from inside the recess 24.

Figure 8:
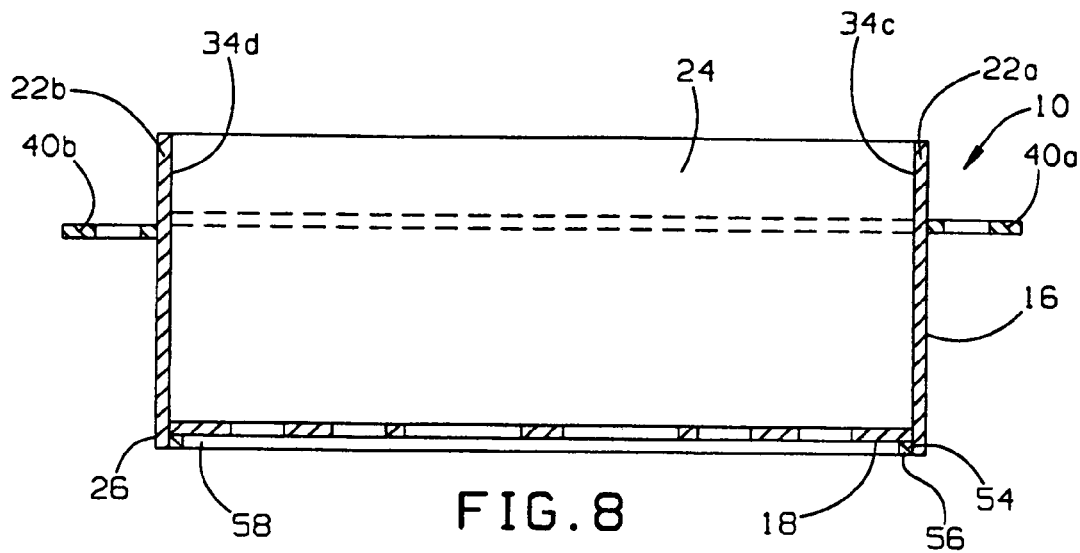
FIG. 8 is a sectional view of the pipe protector shown in FIG. 4, taken along line 8-8.

As shown in FIGS. 2 and 8, the plate 18 is insertable into the recess 24 of the body 16 through the top end 28 and rests in the recess 24 near the bottom end 26. A supporting structure 54 at the bottom end 26 of the body 16 holds the plate 18 within the recess 24. FIGS. 2 and 8 show one example of a supporting structure—a lip 56 having a window 58, which lip 56 depends from the interior surfaces 34a,34b,34c,34d of the walls 20a,20b,22a,22b near the bottom end 26 for supporting the plate 18 within the recess 24. Any other suitable supporting structure may be used, however, including a wedge angled across the corners of the bottom end 26 or at least one set of brackets extending from opposed walls, as examples. In one embodiment, the plate 18 is further secured to the support 54 with an adhesive.

Figure 10:
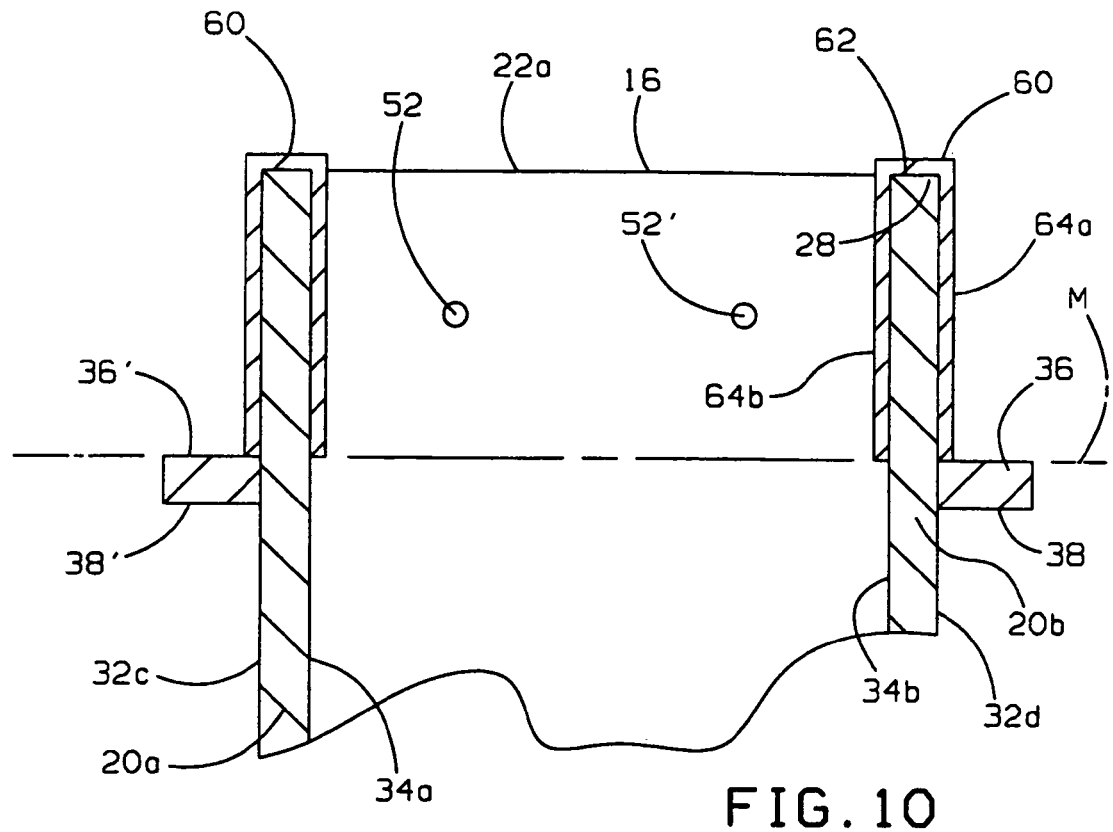
FIG. 10 is a fragmentary cross-sectional view of the pipe protector of FIG. 4, taken along line 10-10, showing a shield positioned on the side walls.

Preferably, as shown in FIG. 10, a shield 60 is securably engageable to the top end 28 of at least one of the side walls 20a,20b for protecting the pipe ends 12 in the recess 24 from damage by, e.g., nails or drills at later stages of construction. The shield 60 has a neck 62, and at least one shield face 64a,64b extending downwardly from the neck 62 in parallel alignment. The neck 62 has a shape and an inner cross-sectional dimension conforming with that of the top edge 30. When the shield 60 is positioned on the top edge 30, the shield faces 64a,64b extend downwardly from the top edge 30 toward the concrete elevation level, designated by the horizontal line M, with one shield face 64a being adjacent to the exterior surface 32d and the other shield face 64b being adjacent to the interior surface 34b of the side wall 20b. Although both shield faces 64a,64b typically terminate above the surface of the concrete, one of shield faces 64a,64b may terminate substantially above that.

The shield 60 is constructed of a rigid corrosion-resistant material, such as a rigid plastic—e.g., PVC and ABS or the like—or a corrosion-resistant metal or other suitable material. Typically, the shield faces 64a,64b are sufficiently thick for resisting permeation by nails and drills. For example, in one embodiment, the shield face may be constructed of galvanized steel and have a thickness ranging from about 0.01 to 0.08 inches. The shield 60 is usually positioned on the side wall 20a,20b that is adjacent to an internal structural wall to be constructed; preferably, the shield 60 is attached to both side walls 20a,20b, as shown in FIG. 10.

Figure 9A:
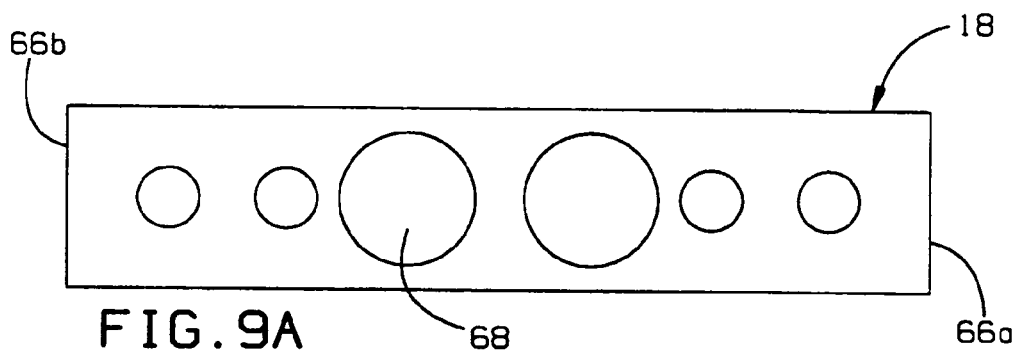
FIG. 9A shows a plate having two large central apertures with two smaller apertures on each side.
Figure 9B:
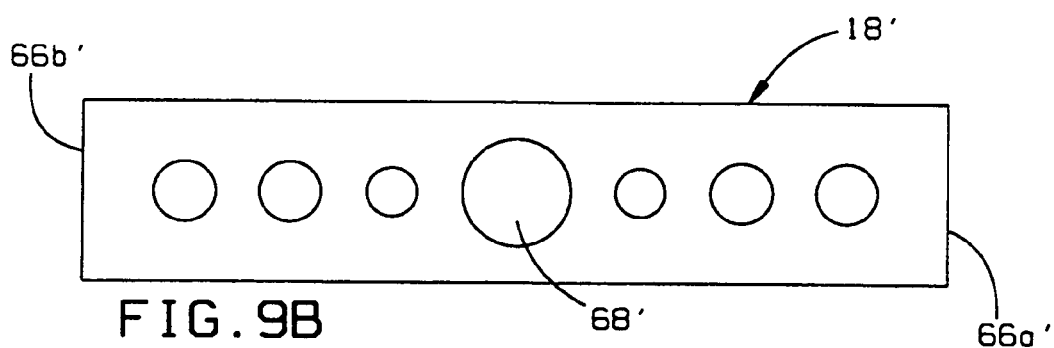
FIG. 9B shows an alternative embodiment of a plate having one large central aperture with three variable-sized apertures on each side.

The plate 18 has a shape and dimension conforming with the recess 24 for proper engagement within the body 16. Typically, as shown in FIGS. 9A-B, the plate 18,18' has two opposed ends 66a,66b,66a',66b' along a longitudinal axis and an opening 68,68' corresponding dimensionally and spatially to each pipe end 12 for fitting the pipe end therethrough. The plate 18 may also have other openings that are not utilized. Typically, the opening 68 is aligned spatially and sized to accommodate a pipe end in accordance with standard plumbing and electric code requirements. The plate 18 may, however, be customized as needed, including each opening 68 being formed on-site to provide the configuration needed.

FIGS. 9A-B show two examples of embodiments of plate 18,18' with variable-sized openings in varied spatial configurations.

Figure 9C:
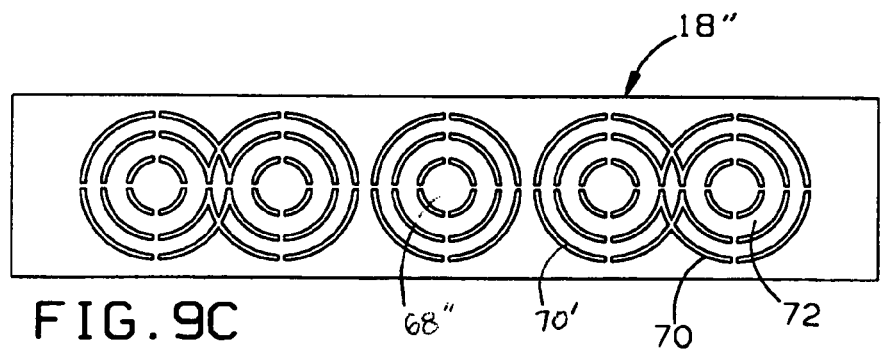
FIG. 9C shows yet another embodiment of a plate having sets of concentric punch-out circles for customizing the plate to accommodate different spatial positionings of pipes of different-sized diameters.

In an alternative embodiment, shown in FIG. 9C, the plate 18" has at least one set 70 of concentric rings 72 with scored or otherwise weakened perimeters for easy removal to form at least one openings. Within the set 70, successively larger rings 72 may be removed as needed to conform the diameter and spatial orientation of the opening 68' so formed to that of a corresponding pipe end 12. As shown, the punch-out set 70 may overlap with an adjacent set 70' to provide greater flexibility in forming an opening 68" that corresponds dimensionally and spatially to a pipe end.

In an alternative embodiment, shown in FIGS. 1-2, a removably attachable cover 74 is provided for closing the open top end 28 of the body 16 in a manner that protects the pipes 12 within from concrete which may accidentally seep over the walls into the recess 24. The attachable cover 74 can be a snap-on cover, a clamp-on cover or some other type of removable and reattachable cover, as an example. The cover may be composed of any rigid material such as plastic, metal, or wood, as examples. The cover is positionable over the top edge 30 to cover the top end 28 of the body and to provide a closed container and cover combination that is substantially impermeable to concrete.

Figure 11:
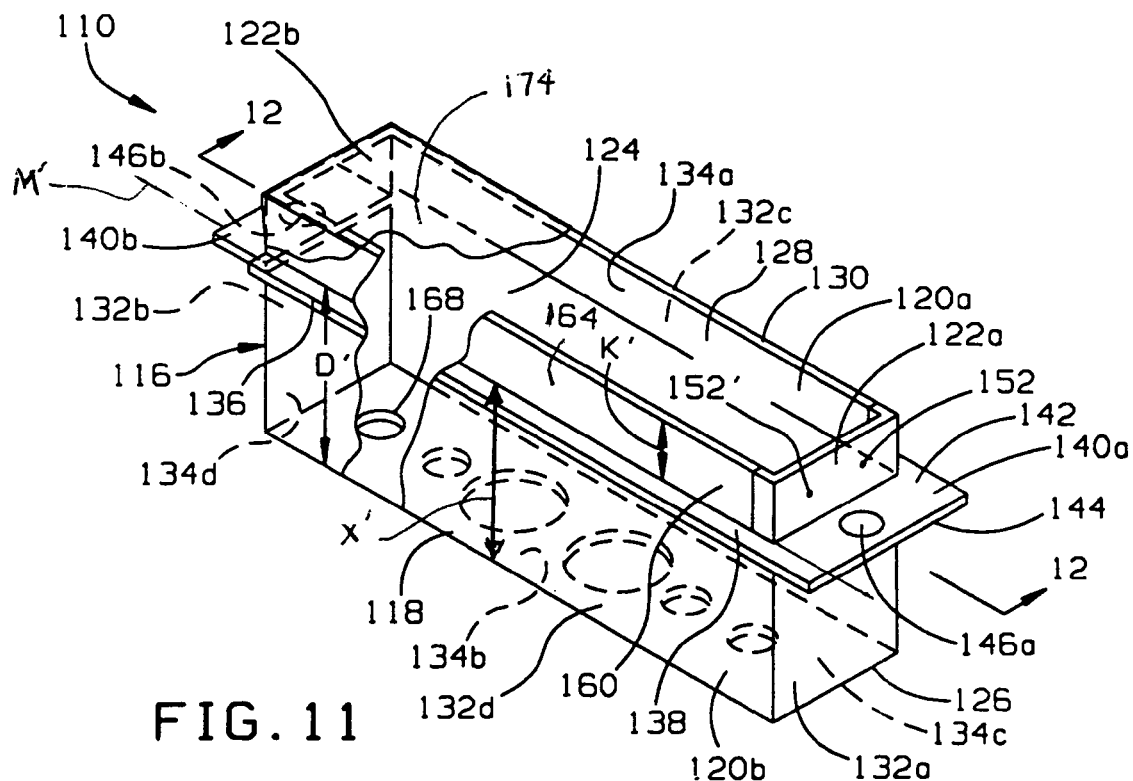
FIG. 11 is a fragmentary perspective view of another embodiment of a pipe protector in accordance with the invention, showing a portion of the interior of a pipe protector, with a cover, having a bottom face secured to the body.
Figure 12:
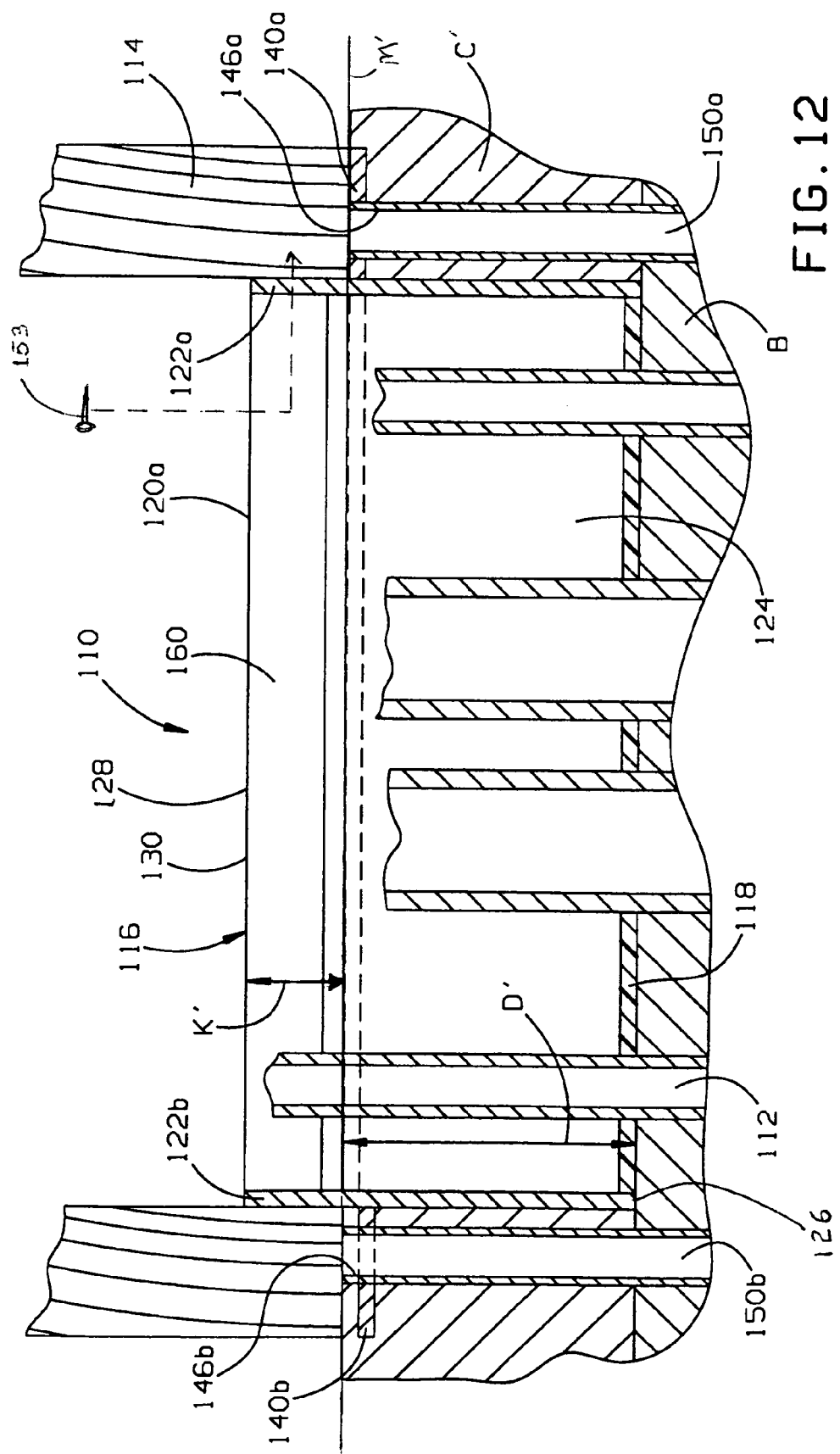
FIG. 12 is a sectional view of the pipe protector of FIG. 11, without the cover, taken along line 12-12 and shown recessed in concrete between frame studs.

FIGS. 11 and 12 illustrate another pipe protector 110 in accordance with the invention. The pipe protector 110 comprises a body 116 and a bottom face 118 secured to the body 116. The body 116 has a two opposed side walls 120a, 120b and two opposed end walls 122a,122b defining a recess 124 therebetween, a bottom end 126, a top end 128 terminating in a top edge 130, and a lateral tab 140a,140b extending from at least one end wall 122a,122b. Each end wall 122a,122b has an exterior surface 132a,132b and an interior surface 134c, 134d. Each side wall 120a,120b has an exterior surface 132d, 132c and an interior surface 134a,134b.

The body 116 has the same dimensions, composition and configuration as the aforedescribed body 16, except that the bottom face 118 is secured at the bottom end. As with body 16, body 116 is dimensionally configured to fit between frame studs. The body 116 is generally rectangular in shape but may have curvature along the vertical axes between adjacent walls. Attachment of the bottom face 118 to the walls 120a, 120b, 122a, 122b at the bottom end 126 is achieved by any suitable fastening means known in the art, including adhesive and nails, as examples.

In one embodiment, the body 116 and the bottom face 118 are constructed of any suitable rigid material such as wood, a rigid plastic, or a corrosion-resistant metal. In another embodiment, the body 116 is a unitary piece formed of a rigid plastic, and the bottom face 118 is also formed of plastic and then secured to the body 116 at the bottom end 126. In an alternative embodiment, the pipe protector 110 is a single, unitary piece formed of rigid plastic and preferably formed by injection molding.

The body 116 has a portion D' and a portion K' which—as described above—are defined by the elevation to which the concrete will be poured with respect to the bottom end 126. In FIG. 11, the horizontal line M' located a vertical distance X' above the bottom end 126 corresponds with the surface of the concrete slab to be formed. FIG. 12 shows the portion D' recessed in the concrete slab and the portion K' extending above the concrete. The top edge 130 of the body aligns with a horizontal plane above the longest pipe end 112 within the recess.

A stud hole 152,152' is typically disposed on one and preferably both end walls 122a,122b in portion K' for accepting a fastener 153—such as a nail—to be driven through the stud hole from inside the pipe protector into an adjacent frame stud.

A level indicator 136 performs the same function as the level indicator 36 described above. Level indicator 136 is disposed on at least one of the side walls 120a, 120b or the end walls 122a, 122b at the concrete elevation level shown by the horizontal line M', as shown in FIG. 12. The level indicator 136 may be in the form of a mark, an etched depression and any other suitable form, preferably including, e.g., a flange 138, as shown.

The lateral tab 140a,140b performs the same function as the aforedescribed lateral tabs 40a,40b. The lateral tab 140a, 140b extends into a generally horizontal plane from at least one end wall 122a,122b and has an upper surface 142 and a lower surface 144. As described above, an aperture 146a, 146b in each lateral tab 140a,140b is dimensionally configured to receive a securing structure 150a,150b for securing the pipe protector 110 to the base before the concrete is poured onto the base. Any suitable securing structure may be used, as described above, including, e.g., an elongated member such as a pipe, a piece of conduit, a rod, a spike, a nail, a stake and any other suitable staking device known in the art. FIG. 12 shows a cross-sectional view of the pipe protector 110 secured to the base B' by the securing structure 150a, 150b driven through each aperture 146a,146b, then recessed in a concrete slab C' formed around the device. Frame studs 114 are shown positioned adjacent to the end walls 122b and 122a of portion K'.

The lateral tabs 140a, 140b have the same disposition with respect to the bottom end 126 and the same planar relationship with respect to each other, affording an end-to-end interconnection of serially adjacent pipe protectors, as described above for lateral tabs 40a,40b. In the embodiment shown in FIG. 12, the lateral tabs 140a,140b extend from the end walls 122a,122b in substantial horizontal alignment with the surface of the concrete. However, as discussed above, the lateral tabs 140a, 140b may extend from any point along the end wall, from between the bottom end 126 through the concrete elevation level, denoted by the horizontal line M'.

As described above for plate 18, the bottom face 118 has an opening 168 corresponding dimensionally and spatially to each pipe end within the recess so such pipe end may be inserted through the opening. The size and spatial orientation of the opening 168 may be customized to accommodate different-sized pipes in various spatial alignments. In one embodiment (not shown), the bottom face 118 includes at least one set of punch-out concentric rings having a weakened perimeter for easy removal, as described above. The set of concentric rings may overlap with an adjacent set of concentric rings to provide more flexibility in conforming the openings with the diameter and spatial orientation of the pipe ends.

Preferably, the pipe protector includes a shield 160 that is securable to the top edge 130 of at least one side wall 120a, 120b for protecting the pipes 112 in the recess 124 from nail damage during later stages of construction. Shield 160 has the same composition and configuration as the aforedescribed shield 60, including having at least one shield face 164 extending downwardly toward the concrete elevation level, which face may terminate at any point above that level. Preferably, the pipe protector 110 has a shield securable to each side wall 120a, 120b.

In one embodiment, a cover 174 is removably attachable over the top end 128 for closing the open top of the body and performing the same function as the aforedescribed cover 74. The cover 174 has the same configuration as described above—i.e., the cover 174 may be a snap-on cover, a clamp-on cover or some other type of removable and reattachable cover, as an example. The cover 174 is removable to allow workmen access to the pipe ends within the recess.

Figure 13:
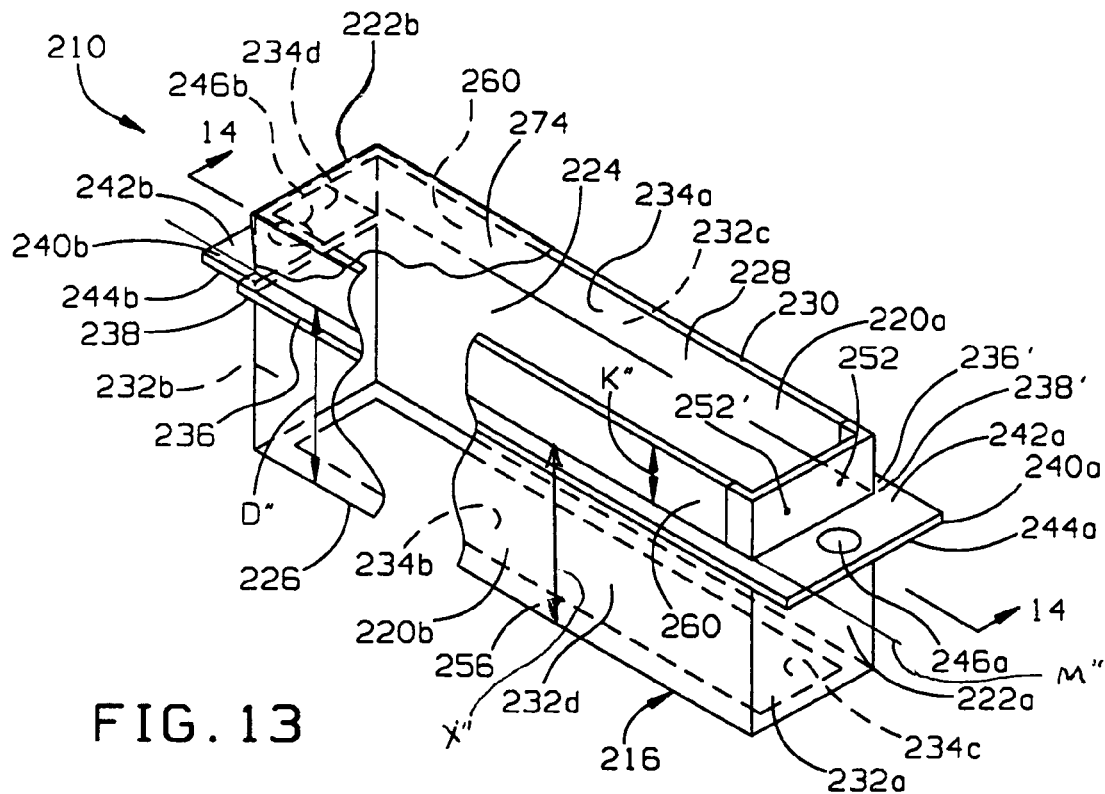
FIG. 13 is a fragmentary perspective view of another embodiment of a pipe protector in accordance with the invention, with a cover.
Figure 14:
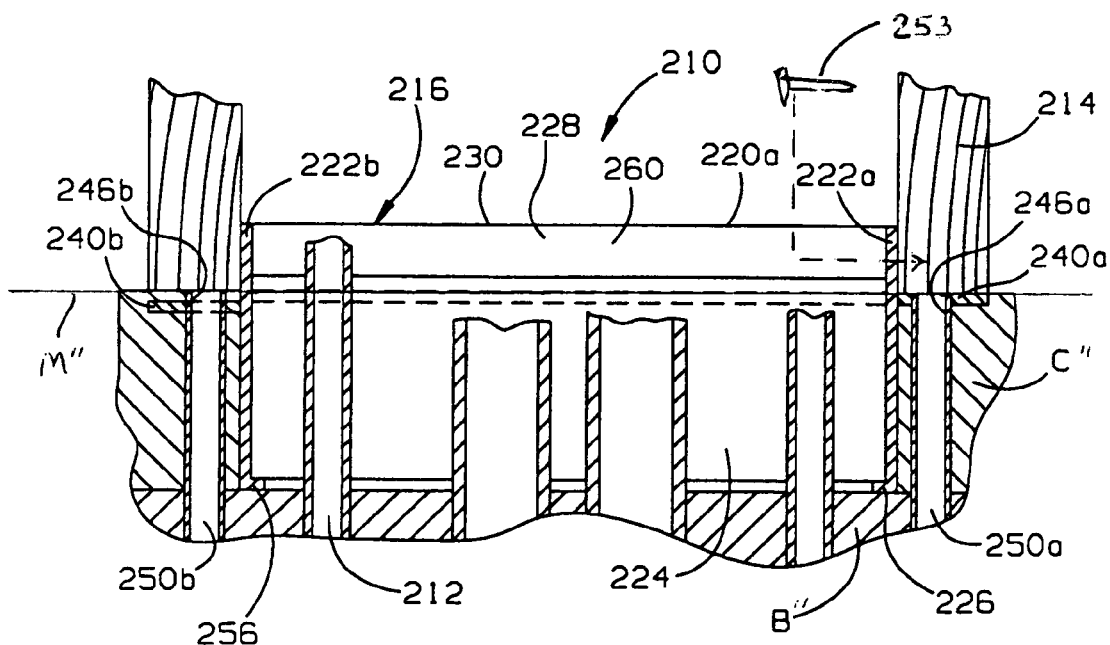
FIG. 14 is a sectional view of the pipe protector of FIG. 13, without the cover, taken along line 14-14 and shown recessed in concrete between frame studs.

In accordance with yet another aspect of the invention, another pipe protector 210, shown in FIGS. 13 and 14, is provided.

The pipe protector 210 is substantially the same as the aforedescribed body 16. The pipe protector 210 includes a rigid body 216 that is suitable for use during building construction where concrete will be poured onto a base having upwardly projecting pipe ends. The body 216 has two opposed side walls 220a,220b, two opposed end walls 222a, 222b, a recess 224 therebetween, a bottom end 226, a top end 228 terminating in a top edge 230, and a lateral tab 240a,240b extending from each of the end walls 222a,222b. Both the bottom end 226 and the top end 228 are open. Each end wall 222a,222b has an exterior surface 232a,232b and an interior surface 234c,234d; each side wall 220a,220b has an exterior surface 232d,232c and an interior surface 234a,234b.

The pipe protector 210 is generally rectangular in shape but may have curvature along the vertical axes between adjacent walls. The pipe protector 210 is dimensionally configured with a width dimension and a length dimension to fit between frame studs in building construction. The width—i.e., the distance between exterior surfaces of the side walls—is substantially complementary to the width of a frame stud, and the length—i.e., from end wall to end wall—allows the device to fit between adjacent frame studs 214. The pipe protector 210 may be constructed of any rigid, corrosion-resistant material such as plastic (e.g., PVC or ABS), wood, or a corrosion-resistant metal. Preferably, the pipe protector 210 is a single, unitary piece formed of a rigid plastic and most preferably molded of a rigid plastic by, e.g., injection molding.

In the embodiment shown in FIGS. 13 and 14, the body 216 has a lip 256 extending from at least two opposed walls 220a,220b 222a,222b at the bottom end 226 and directed inwardly toward the recess along a horizontal plane. The lip 256 is generally planar so as to make contact with the base B" when the body is positioned thereon.

As described above for the lateral tabs 40a,40b, the lateral tabs 240a,240b extend outwardly from the end walls 222a, 222b into a horizontal plane disposed between the bottom end 126 and the concrete elevation level, denoted by the horizontal line M" and corresponding with the surface of the concrete slab to be formed. Preferably, the lateral tabs 240a,240b align with the surface of the concrete slab to be formed, as shown in FIG. 14. Each lateral tab 240a,240b has an upper surface 242a,242b, a lower surface 244a,244b, an aperture 246a, 246b, and a length sufficient to perform the same function as the lateral tabs 40a,40b described above; i.e., to secure the body 216 to base B" by receiving a securing structure 250a, 250b through the aperture 246a,246b. The securing structure 250a,250b is as described above for securing structure 50a, 50b.

In one embodiment, the body 216 includes a level indicator 236,236' on at least one wall 220a,220b,222a,222b for guiding the formation of the concrete slab to a pre-determined elevation, as described above for the level indicator 36,36'. The level indicator 236,236' is in alignment with horizontal line M" at a vertical distance X" from the bottom end 226. The level indicator 236,236' may be of any suitable form such as a mark, a depression etched into the wall, or a flange 238,238', as shown, as examples. Preferably, the flange 238,238' extends laterally from at least one of the side walls 222a,222b.

In the embodiment shown in FIGS. 13 and 14, one of the lateral tabs 240a is contiguous with the flange 238,238', and the other lateral tab 240b extends into a plane parallel and adjacent to the flange 238,238'. The cooperative spatial relationship that characterizes the lateral tabs 40a,40b applies to the lateral tabs 240a,240b. That is, the lateral tabs 240a,240b extend into different parallel planes so that when the pipe protector 210 is positioned serially adjacent to another pipe protector 10,110,210', the lateral tabs on the facing end walls of the adjacent pipe protectors align vertically as do the apertures 46,146,246. The cooperative spatial relationship of the lateral tabs allows the pipe protector 210 to be interconnected with another serially adjacent pipe protector in an end-to-end configuration.

Preferably, a stud hole 252,252' is disposed on at least one of the end walls 222a,222b in portion K''' of the body. The stud hole 252,252' performs the same function discussed above for stud hole 52, in that a nail or other fastener 253 may be driven from inside the pipe protector 260 through the stud hole and into a frame stud. Preferably, the end wall has at least one stud hole 252,252'.

A shield 260, which performs the same function and has the same configuration as the aforedescribed shield 60, is securably engageable with the top edge 230 of at least one side wall 220a,220b.

FIG. 13, in a fragmentary view, shows a cover 274 securable to the top end 228 for protecting the recess of the body 216 from concrete that may otherwise splash into the recess. Cover 274 is substantially as described above.

FIG. 14 shows the pipe protector 210, without the cover 274, partially recessed in the concrete slab C with the lateral tabs 240a,240b substantially in alignment with the surface of the concrete. The pipe ends 212 are recessed within the pipe protector 210 and below a plane aligned with the top edge 228. Securing structures 250a,250b driven downwardly through the apertures 246a,246b in each lateral tab 240a, 240b extend into the base B". FIG. 14 shows the securing structures 250a,250b cut flush with the concrete surface, with frame studs 214 erected adjacent to each end wall 222a,222b.

In accordance with yet another aspect of the invention, a method is provided for protecting pipes from movement and damage and from injuring individuals at a building construction site, using the aforedescribed pipe protectors 10,110,210. As such pipe protectors 10,110,210 have been described in detail above, further description is not provided here.

The method comprises prior to the formation of a concrete slab, positioning a body of a pipe protector in accordance with the invention—such as body 16,116,216 of pipe protectors 10,110,210 shown in FIGS. 7, 12, and 14, respectively—on a base having at least one pipe end to be protected and on which concrete will be poured. The body is positioned so that the bottom end—such as bottom end 26,126,226—substantially contacts the base B,B',B" and the pipe ends to be protected extend into the recess, such as recess 24,124,224. In such position, the body 16, 116, 216 surrounds an area of the base around the pipe ends so as to form a barrier between such area and an area of the base external to the body on which the concrete slab C will be formed.

The pipe protector 10,110,210 is then secured to the base B,B',B" by driving a securing structure such as securing structure 50,150,250, described above, downwardly through the aperture at least one lateral tab—such as aperture 46,146,246 of lateral tab 40,140,240—and into the base B,B',B" for a depth sufficient to restrict the pipe protector 10,110,210 from moving as concrete is poured onto the base. FIG. 3 shows the pipe protector 10 secured to base B before formation of the concrete slab. The concrete is then poured outside the pipe protector.

In one embodiment, wherein the pipe protector has lateral tabs extending outwardly into a horizontal plane below the proposed surface of the concrete, the entire securing structure 150,150,250 may be driven below a horizontal plane corresponding with the surface of the concrete.

In a further embodiment, the method includes positioning a removably attachable cover such as cover 74,174,274 on the top edge to prevent concrete from entering the recess through the top end.

In one embodiment, the method includes controlling the depth of the concrete by aligning the surface of flowable concrete with a level indicator such as level indicator 36,136, 236—preferably in the form of a flange 38,138,238, described above. When the concrete has been applied to the base, the surface of the concrete aligns substantially with a horizontal plane dividing the pipe protector 10, 110, 210 into a portion D,D',D" recessed below the concrete surface and a portion K,K',K" extending above the surface of the concrete.

The method also includes, after the concrete has set, removing the securing structure 50,150,250 from above the concrete surface. The removing step is typically accomplished by cutting the securing structure flush with the concrete surface and removing the cut portion. FIGS. 7, 12, and 14 show the device after the securing structure has been cut flush with the concrete surface. When the securing structure has been removed from above the concrete, a frame stud may be positioned adjacent to the portion K,K',K" of the end wall. The removing step is not necessary, however, when the entire securing structure 50,150,250 is driven below the horizontal plane corresponding with the concrete surface. In such case, the lateral tabs and the securing structure 50,150,250 would be covered by the concrete.

Preferably, the method includes securably attaching a rigid shield such as the shield 60,160,260, described above, on the top edge 30,130,230 of at least one of the side walls 20,120, 220 to protect pipes 12,112,212 within the recess 24,124,224 against damage during later stages of construction. The shield 60,160,260 is generally attached to the side wall 20,120,220 that will be adjacent to dry wall to which trim and flooring will be applied. Preferably, the shield is attached to both side walls. The shield can be attached before or after the concrete is poured.

In one aspect of the invention wherein the pipe protector used is open at both the top end and the bottom end, such as pipe protector 210, the method further includes: (a) providing a plate such as plate 18 configured dimensionally to be insertable into the recess where the body has a supporting means for holding the plate in the recess, the plate having an opening configured dimensionally and spatially to correspond to each pipe end in the recess for fitting such pipe end therethrough; (b) fitting each pipe end through the corresponding opening in the plate; and (c) guiding the plate downwardly along the pipe ends into the recess to rest near the bottom end.

In another embodiment, the method further includes customizing the dimension and spatial orientation of at least one opening in the plate. The opening, such as opening 68 in plate 18, is formed by removing at least one ring from a set of concentric rings having a weakened perimeter in the plate—such as ring 72 from concentric ring set 70 in plate 18"—to form an opening corresponding with a pipe end to be protected.

Yet another embodiment of the method uses a pipe protector having a bottom face—such as pipe protector 110 having bottom face 118 and body 116—to protect pipe ends around which a concrete slab will be formed at a construction work site. The method includes positioning the pipe protector on the base prior to forming the concrete slab, so each pipe end to be protected fits through a corresponding opening in the bottom face and extends into the recess, and the bottom face 118 rests adjacent to an area of the base surrounded by the body. In such position, the pipe protector forms a barrier between the area of the base surrounded by the body and an area of the base external to the body on which the concrete slab will be formed. The pipe protector is then secured to the base with a securing structure to restrict the pipe protector from moving in the poured concrete. After the concrete slab has been formed, the securing structure is removed from above the concrete surface to allow construction to continue.

For protecting an extended array of pipes, one embodiment of the method includes steps for configuring a chain of pipe protectors, which are carried out after a pipe protector, such as pipe protector 10,110,210, has been positioned on the base. The method includes setting another pipe protector, such as pipe protector 10',110',210', serially adjacent to the previously positioned pipe protector in an end-to-end configuration (such as shown in FIG. 5 with pipe protectors 10' and 10), wherein a lateral tab on the newly set pipe protector—such as lateral tab 40a',140a',24a'—is in a cooperative spatial relationship with a lateral tab on the previously positioned pipe protector and aligns vertically with such lateral tab, such as lateral tab 40b,140b,240b. The set pipe protector is then secured to the positioned pipe protector by interconnecting the vertically aligned lateral tabs. The securing step typically involves driving a securing structure—such as securing structure 50a,150a,250a—through the vertically aligned lateral tabs and into the base to a depth sufficient to restrict the serially adjacent pipe protectors from moving on the base. The securing structure is driven through the apertures on the vertically aligned lateral tabs. Alternatively, the adjacent pipe protectors may be interconnected by tying the vertically aligned lateral tabs together with a string, cord, wire or other such device that is passed through the apertures on each lateral tab, or by stapling the tabs together, or by any other suitable securing means. The setting and securing steps may be repeated as needed to form a line of pipe protectors sufficiently long for protecting an array of pipe ends.

After the securing structure extending above the concrete has been cut flush with the concrete surface and removed, construction may continue with, e.g., the positioning of a frame stud adjacent to the pipe protector, so the frame stud abuts against the portion of the body above the concrete, such as portion K,K',K". The pipe protector may then be secured to the frame stud by driving a fastener such as a nail or screw through at least one stud hole in the end wall from inside the pipe protector.

Another embodiment includes attaching a shield to the top end of at least one side wall for protecting the pipe ends within the recess. The shield may be attached before or after the concrete slab is formed.

In yet another embodiment, the method includes laying the pipes in the base, prior to formation of the concrete slab, so the pipe ends do not project above the top edge of the pipe protector when the pipe protector is positioned on the base.

The present invention may be embodied in other forms without departing from its spirit or essential characteristics. Although specific embodiments are shown by way of example, these embodiments are to be considered in all respects as only illustrative and not restrictive as to the scope of the invention. Rather, the invention covers all modifications, equivalents and alternatives that fall within the scope of the invention, as defined by the following appended claims.

What is claimed is:

1. A pipe protector for protecting upwardly projecting pipe ends at a building construction site, the pipe protector comprising:

a rigid body for securing to a base on which a concrete slab will be formed that has at least one pipe end to be protected; the body having a completely open bottom end, an open top end, two opposed side walls and two opposed end walls defining a recess between the bottom end and the open top end, and a lateral tab extending from each end wall, the lateral tabs extend into a different but parallel plane with respect to each other to allow the pipe protector to be secured to another serially adjacent pipe protector;

the body being suitable for positioning on the base so the bottom end contacts the base and the body surrounds the pipe ends, forming a barrier between an area surrounding the pipe ends and the base external to the body on which the concrete will be poured such that after the concrete slab is formed, a portion of the body extends above the concrete and the open top provides access to the pipe ends within the recess.

2. The pipe protector of claim 1 wherein the body is dimensionally configured to fit between frame studs in a building under construction.

3. The pipe protector of claim 1 wherein the body further comprises a level indicator for setting the depth of the concrete, disposed on at least one wall selected from the side walls and the end walls at a vertical distance from the bottom end corresponding with the surface of the concrete to be poured outside the body.

4. The pipe protector of claim 3 wherein the level indicator comprises a flange extending outwardly from the body.

5. The pipe protector of claim 1 further comprising a cover removably attachable at the top end for preventing concrete from entering the recess through the top end.

6. The pipe protector of claim 1 wherein the body is formed of a rigid plastic.

7. The pipe protector of claim 6 wherein the body is a unitary piece molded of rigid plastic.

8. The pipe protector of claim 1 wherein each lateral tab has an aperture adapted to receive a securing structure therethrough for securing the pipe protector to the base.

9. The pipe protector of claim 1 wherein each lateral tab is disposed on the end wall between the bottom end and an elevation from the bottom end corresponding with the surface of the concrete to be poured.

10. A pipe protector comprising;

a rigid body for securing to a base on which a concrete slab will be formed that has at least one pipe end to be protected; the body having an open bottom end, an open top end, two opposed side walls and two opposed end walls defining a recess between the bottom end and the open top end, a shield securable to the top edge of at least one of the side walls for further protecting the at least one pipe end in the recess, and a lateral tab extending from each end wall, the lateral tabs extend into a different but parallel plane with respect to each other to allow the pipe protector to be secured to another serially adjacent pipe protector;

the body being suitable for positioning on the base so the bottom end contacts the base and the body surrounds the pipe ends, forming a barrier between an area surrounding the pipe ends and the base external to the body on which the concrete will be poured such that after the concrete slab is formed, a portion of the body extends above the concrete and the open top provides access to the pipe ends within the recess.

11. A pipe protector comprising;

a rigid body for securing to a base on which a concrete slab will be formed that has at least one pipe end to be protected; the body having an open bottom end, an open top end, two opposed side walls and two opposed end walls defining a recess between the bottom end and the open top end, a lateral tab extending from each end wall, the lateral tabs extend into a different but parallel plane with respect to each other to allow the pipe protector to be secured to another serially adjacent pipe protector, and a plate, disposed in the recess and over the open bottom end, having an opening that corresponds dimensionally and spatially to each pipe end for fitting the pipe end therethrough;

the body being suitable for positioning on the base so the bottom end contacts the base and the body surrounds the pipe ends, forming a barrier between an area surrounding the pipe ends and the base external to the body on which the concrete will be poured such that after the concrete slab is formed, a portion of the body extends above the concrete and the open top provides access to the pine ends within the recess.

12. The pipe protector of claim 11 wherein the plate is secured to the body.

13. The pipe protector of claim 11 wherein the plate is secured to the body above the bottom end.

14. The pipe protector of claim 11 further comprising a supporting structure for supporting the plate in the recess.

15. The pipe protector of claim 14 wherein the supporting structure is a lip directed toward the recess for supporting the plate in the recess.

16. The pipe protector of claim 11 wherein the securing structure comprises an elongated member for driving into the base to a depth sufficient to restrict the body from moving thereon.

17. The pipe protector of claim 11 wherein at least one opening on the plate is formed by removing at least one concentric ring from a set of concentric rings having a weakened perimeter on the plate so as to customize the diameter and spatial orientation of such at least one opening to fit a corresponding pipe end.

* * * * *